Patented Oct. 25, 1938

2,134,434

UNITED STATES PATENT OFFICE 2,134,434

MANUFACTURE OF ALKYL-PHENYLOXY-ETHERS OF 2:4 DINITROBENZENE

Troy Lee Cantrell and James Otho Turner, Lansdowne, Pa., assignors to Gulf Oil Corporation, Pittsburgh, Pa., a corporation of Pennsylvania No Drawing. Application April 24, 1937, Serial No. 138,858

7 Claims. (Cl. 260—612)

This invention relates to the manufacture of alkyl-phenyl oxy-ethers of 2:4-dinitrobenzene, and it comprises methods of making such ethers wherein 2:4-dinitrochlorobenzene is reacted in an alcoholic solvent with a metal alkyl-phenolate, advantageously an alkali metal phenolate, the by-product metal chloride is separated from the alcoholic solution of the ether and the alkyl-phenyl oxy-ether of 2:4-dinitrobenzene is recovered from the alcoholic solution so obtained, and it also comprises the new alkyl-phenyl oxy-ethers of 2:4-dinitro-benzene so obtained, said new ethers containing at least one alkyl group having two or more carbon atoms, attached to the said alkyl-phenyl group and being useful for improving mineral oils and mineral oil compositions and for other purposes, all as more fully hereinafter described and as claimed.

By the present invention we obtain new and valuable substituted diaryl oxy-ethers having the following formula:

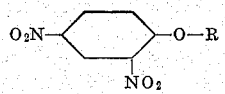

wherein R represents an alkylated phenyl group, containing at least one alkyl group having two or more carbon atoms. Various of these alkyl-substituted phenyl ethers are particularly advantageous, such as those containing at least one alkyl group attached to the phenyl group in the position ortho to the ether group; those containing at least one alkyl group having 3 or more carbon atoms; those containing alkyl groups having branched chains; those containing 2 or more alkyl groups, that is, polyalkyl-phenyl ethers; and those containing combinations of such alkyl groups.

In general, these new diaryl ethers mentioned ante are soluble in mineral oils and in alcohol and other organic solvents, but are insoluble in water and aqueous alkalies. They may be used for many and various purposes with advantage. For instance, when small amounts of these new alkyl-phenyl oxy-ethers, particularly those containing at least one alkyl group having a branched chain are dissolved in mineral oil, stable lubricants are obtained which have improved lubricating properties such as improved extreme pressure characteristics, etc. In our copending application Serial No. 138,860, we have described and claimed improved methods of lubrication and improved lubricants obtained with the aid of these substituted diaryl ethers.

The above described diaryl ethers are obtained by condensing 2:4-dinitrobenzene with a suitable metal phenolate having the following formula: M—O—R wherein M is a metal capable of combining with chlorine and of effecting the desired condensation, and R is an alkyl-phenyl group. The alkali metal phenolates are advantageous and are ordinarily employed in the practice of the present process. However, other metal phenolates may be used.

In the present invention, we find it advantageous to conduct the said reaction or condensation in an alcoholic solvent. The substituted diaryl ethers are soluble in alcohol, as are the nitrochlorobenzene and the metal phenolates here employed. In this way, the reaction is facilitated and the insoluble chloride is precipitated as formed. Also, by conducting the reaction at boiling temperature under reflux, the reaction temperature can be readily controlled, the boiling point of the volatile alcohol employed more or less fixing the temperature. In most cases, the present reactions proceed rapidly, but gently, at temperatures between 150° and 200° F. Reaction at about 175° F. is good and commercial ethyl alcohols, having a boiling range of 167–175° F., may be advantageously employed as the solvent. However, other volatile alcohols may be employed as the solvent.

Thus in the ordinary practice of the present invention, we first dissolve 2:4-dinitrochlorobenzene in ethyl alcohol, heating the mixture to boiling under reflux to quickly obtain a clear solution. Separately, there is prepared an alcohol solution of the metal phenolate in ethyl alcohol; ordinarily by dissolving the alkyl-phenol in alcoholic caustic soda solution. The solution of metal phenolate is then gradually added to the boiling solution of the nitrochlorobenzene compound while continuing the boiling under reflux. The addition of the phenolate solution is so adjusted as to obtain a rapid but controllable reaction. After all the metal phenolate has been so added, the mixture is further boiled under reflux to complete the reaction.

After the reaction is complete, the by-product metal chloride is separated from the alcohol solution of the substituted diaryl ether; the alcohol is removed by distillation and recovered for reuse in the process; and the oxy-ether is then recovered and washed until free of residual alcohol, metal chloride and other soluble impurities. The wet diaryl ether is then dried.

The separation of the metal chloride may be effected in various ways. Sometimes the insoluble chloride is allowed to settle and the alcohol solution decanted or syphoned from the deposited salt. However, the boiling alcohol solution may be slightly cooled to about 150° F., and filtered to remove the salt. This procedure is advantageous, as the hot filtrate may be directly sent to a suitable still for recovering the alcohol. By operating in this way the heat requirement for evaporating the solvent is materially reduced.

After the salt has been removed, the diaryl ethers may be recovered from the alcohol solution by several methods. In most of those methods, substantially all of the alcohol is distilled off and recovered for reuse in the process. The diaryl ethers, being molten in most cases at the distilling temperature, can be readily withdrawn from the still. For instance, the hot filtrate mentioned ante, or any of the alcohol solutions freed of chloride, may be distilled in any of the usual commercial stills to remove the solvent alcohol, and to obtain diaryl ethers which may be further purified if desired. While it is desirable to directly recover as much of the alcohol, as possible for reuse in these processes, it is not entirely essential to remove all traces of the alcohol by distillation, when the diaryl ethers are subsequently purified by washing and drying as set forth post. In some cases, residual amounts of alcohol may be retained in the diaryl ethers and removed in the subsequent purification. This is sometimes advantageous, as it maintains the ethers more fluid and facilitates removal from the still. Sometimes, most of the alcohol may be removed by distillation to obtain a concentrated alcoholic solution from which most of the diaryl ethers will crystallize upon cooling; this being advantageous with diaryl ethers which at room temperatures are crystalline solids. In such cases, the crystallized ethers may be separated from the mother liquor and this liquor further processed to obtain additional amounts of the ether. After all or most of the alcohol has been removed and the ether so recovered, it may be washed with dilute aqueous solution of alkali and with water to further purify the diaryl ether. These substituted diaryl ethers being immiscible with water and substantially insoluble in aqueous solutions, the water-soluble impurities, such as residual metal chloride, alcohol and sodium phenolate may be readily removed by washing. In so washing the diaryl ethers, it is advantageous to employ dilute aqueous solutions of sodium hydroxide, such as 1% solutions. In this way, soluble impurities, particularly any traces of metal phenolate may be readily removed, the sodium hydroxide retarding hydrolysis of such metal phenolates. After the caustic wash, the diaryl ethers may be further washed with water to remove residual hydroxide. Likewise, any metal chloride not removed in the first washing may be completely removed. As excess sodium phenolate may be readily removed and recovered in this way, we find it advantageous to use a slight excess of sodium phenolate in the present methods, as in this way a complete conversion of the nitrochlorobenzene into diaryl ether may be insured.

After the diaryl ether has been thoroughly washed, it is then dried. It may be dried in various ways. The diaryl oxy-ethers, which are crystalline or solid at room temperature, may be dried in a current of warm air. Liquid diaryl ethers or those which readily melt upon heating may be dried by heating them to elevated temperatures to evaporate the remaining moisture. In those embodiments of this invention, wherein the residual water is boiled off, it is sometimes advantageous to blow a current of warm air or inert gas through the hot diaryl ether.

By varying the specific metal phenolates condensed with the 2:4-dinitrochlorobenzene, in the present process, we obtain a wide range of alkyl-phenyl ethers of dinitrobenzene. Thus by selecting a particular alkyl-phenol or mixtures of such phenols, we can obtain ethers having particular properties rendering them advantageous for one or more purposes.

Any of these alkyl-phenols may be readily converted into the desired metal phenolate for use in the present methods. For instance, the sodium or other alkali metal phenolates may be prepared, in the form of alcoholic solutions ready for use in the present methods, by adding the desired phenol or mixture of phenols to an alcoholic solution of sodium hydroxide. The alcoholic solution of sodium hydroxide may be advantageously prepared by mixing an aqueous solution of caustic containing approximately 57.5% of sodium hydroxide with a volatile alcohol such as ethyl alcohol and heating the mixture with stirring to approximately 150° F. until clear solution is obtained; an advantageous ratio being 70 pounds of such aqueous sodium hydroxide solution to 621 pounds of ethyl alcohol. To the warm alcoholic solution of caustic so obtained there is added the alkyl-phenol, such as a mixture of olefin-phenol condensation products, and the mixture stirred until the sodium phenolates are obtained. The solutions of metal phenolates so prepared may be employed with advantage in the present process. However, the desired solution may also be prepared by directly dissolving sodium phenolate in the volatile solvent.

In the practice of this invention, the metal phenolates may be prepared by the above method from a wide range of alkyl-phenols. Some of the alkyl-phenols which may be advantageously employed, are those of the class represented by the following formula:

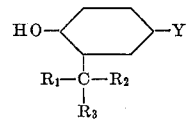

wherein Y represents hydrogen or an alkyl group and $R_1$, $R_2$ and $R_3$ represent hydrogen or an alkyl group, at least one of the substituents $R_1$, $R_2$ and $R_3$ being an alkyl group; Y sometimes being an alkyl group similar to that present in the ortho position. Of these, the phenols in which at least two of the substituents $R_1$, $R_2$ and $R_3$ are alkyl groups, are particularly advantageous; such phenols containing at least one branched chain alkyl group. And when Y is also an alkyl group similar to that present in the ortho position, then such phenols contain two branched chain alkyl groups, these being in the ortho and para positions respectively.

These phenols are quite distinct from the simple phenols such as cresols or xylols in that they are relatively insoluble in dilute aqueous solutions of caustic soda whereas phenol itself and the simple phenols are soluble in such solutions. Illustrative of this class of alkali-insoluble alkyl-phenols, we may mention the following phenols:

o-Isopropyl phenol
o-Tertiary butyl phenol
2:4-di-tertiary butyl phenol
o-Isoamyl phenol
o-Tertiary amyl phenol The substituted diaryl ethers produced from them are typical of this invention and a few of the representative structural formulae are as follows:

From ortho-isoamyl phenol,

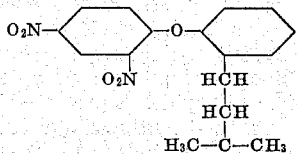

From ortho-tertiary amyl phenol,

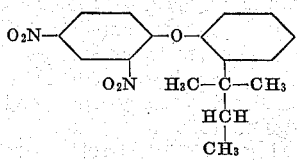

From ortho-tertiary-butyl phenol,

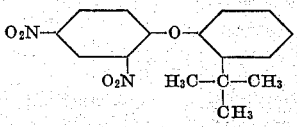

From 2:4-tertiary-butyl phenol,

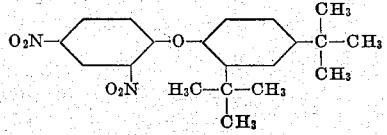

From ortho-isopropyl phenol,

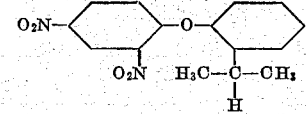

We may employ any of these alkyl phenols or mixtures of them in the commercial practice of this invention. In general, we have found that alkyl-phenols or mixtures of them, having the following properties, yield valuable substituted diaryl ethers according to this invention.

| | |
|---|---|
| Gravity: °API | 7.9–30.0 |
| Specific gravity: 60°/60° F | 1.015–.087 |
| Viscosity, SUV: 100° F. (seconds) | 75–(solid) |
| Pour: (liquid only) °F | 0–30 |
| Melting point: (solids only) °F | 70–275 |

Also, we have found that the metal phenolates obtained from the mixtures of alkylated phenols obtained by reacting phenols with olefins in the presence of sulfuric acid and which are water-insoluble products having anti-oxidant properties, are advantageous in the present process, as they yield alkyl-phenyl ethers which are advantageous improvement agents for mineral oils. Such olefin-phenyl condensation products and methods of preparing the same are disclosed, for example, in the prior co-pending application of Stevens and Gruse, Serial No. 702,258, filed December 13, 1933, now Patent No. 2,061,111, and in the co-pending applications of Troy Lee Cantrell, Serial No. 64,413, filed February 17, 1936, and Serial No. 99,488, filed September 4, 1936, to which reference may be had for further details. The disclosures of the co-pending applications referred to constitute in effect part of the disclosure of our present application, insofar as relates to the preparation of anti-oxidant materials, (alkyl-phenols), which are used as starting materials for preparing the metal phenolates employed in the present process.

Referring, for example, to the aforesaid co-pending application, Serial No. 99,488, there is disclosed a process of manufacturing an anti-oxidant wherein a phenol is mixed with from 1 to 10 per cent of sulfuric acid having a strength of 60 to 100 per cent, or even fuming sulfuric acid, and an olefin or a mixture of olefins, is passed, preferably in the vaporous or gaseous phase, through the liquid mixture until the phenol undergoing reaction has gained in weight from 100 to 200 per cent, or thereabouts, followed by washing the product so obtained with water and with caustic soda solution, the concentration of which does not exceed 15 per cent. Various phenols may be employed, for example phenol ($C_6H_5OH$) itself, the three cresols $$H_3C-C_6H_4-OH,$$

and certain xylenols $(H_3C)_2-C_6H_3-OH$, and crude cresylic acids also may be employed. The pyridines should be removed by conventional methods, such as washing with acid or by distillation.

As olefinic material there may be employed individual olefins themselves, mixtures of olefins, or mixtures of olefinic and non-olefinic material. By way of example, the olefinic starting material may be butylenes, amylenes, refinery gases containing normally gaseous olefins (propylene, butylene) in varying amounts, and cracked distillates or other relatively low-boiling hydrocarbon mixtures containing normally liquid olefins and in some instances also containing substantial amounts of dissolved normally gaseous olefins.

When the reaction is conducted with the olefin in the gaseous phase, the product is relatively highly concentrated with respect to effective anti-oxidant material and may not require distillation or concentration for the purpose of isolating the latter. On the other hand, when the reaction is conducted with the olefinic material in liquid phase, and especially when the concentration of olefins in the starting material is comparatively low, the product may be relatively dilute with respect to the effective anti-oxidant material, comprising for example a solution of such anti-oxidant in gasoline-like polymers or unreacted liquid hydrocarbons. In such case, the antioxidant material may be concentrated by distillation or otherwise as set forth in the above-mentioned co-pending applications, prior to treatment with the alcoholic solution of caustic soda to obtain the metal phenolates employed in the present invention.

The exact chemical and structural natures of the anti-oxidant materials, as thus prepared and employed as a starting material in the manufacture of our improved addition agents, is largely obscure. Although we have been able to identify certain types of compounds in these anti-oxidant material, it will be realized that, especially since mixtures of various phenols and mixtures of various olefins are frequently employed in the manufacture of these anti-oxidants, the number of possible chemical compounds is large and varied. In general, they differ from the simple alkylated phenols in that they are insoluble in dilute caustic soda solution, and also in that they are good anti-oxidants and gum-inhibitors, whereas simple alkylated phenols are not. In general, also, the alkylations, in such instances as they occur, are of secondary and tertiary types; the methods set forth in the above co-pending applications do not produce normal or primary alkylation linkages. However, in the present invention we may also employ alkylated phenols with normal or primary linkages to obtain useful diaryl ethers thereof. Those alkylated phenols are themselves undesirable for addition to mineral oils, due to the fact that both such materials (alkylated phenols with normal or primary linkages) tend to be insoluble in high-gravity lubricating oils. It is possible that certain alkylated phenols of normal or primary linkages might be satisfactory for addition to such mineral oils, provided the chains were long enough, say chains of four carbon atoms or more, on account of the closer resemblance in structure of such compounds to paraffinic lubricating oil constituents. Such long chain alkylated phenols may be likewise employed in the present invention and they too converted into useful diaryl ethers thereof by the present methods.

We have identified as constituents in the various anti-oxidant materials prepared as set forth hereinbefore such compounds as follows:

Ortho-isopropyl phenol
Ortho-tertiary butyl phenol
2:4-di-tertiary butyl phenol
Ortho-isoamyl phenol
Ortho-tertiary amyl phenol Three of the above phenols namely, the ortho-isopropyl, the ortho-tertiary butyl and the ortho-tertiary amyl phenols may be represented generically by the following formula:

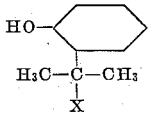

wherein X represents hydrogen, $CH_3$, or $C_2H_5$.

In addition to the above listed alkyl phenols, similar derivatives of various homologues of mono-, di-, and poly-hydroxy phenols may be present. It may be remarked, however, that while some of the constituents of such anti-oxidants may be identified, it is difficult or impossible to identify all of the constituents of any one anti-oxidant material of the character indicated and it is equally impossible to say which particular compound or type of such compound may be the most important. However, the fact remains that anti-oxidants may be prepared in the manner set forth hereinbefore and in the aforesaid co-pending applications, and such materials comprise suitable starting materials for making the metal phenolates and the diaryl ethers obtained from them in accordance with our present invention; certain of the constituents of the anti-oxidant starting materials which are not in and of themselves effective as anti-oxidants may, nevertheless, be capable of being converted by the present methods into materials having useful properties.

We prefer to employ as starting materials, the anti-oxidants, prepared as set forth above and in the aforesaid co-pending applications, having physical properties within the following range:

| | |
|---|---|
| Gravity: °API | 15.0 to 25.0 |
| Specific gravity: 60°/60° F | 0.9659 to 0.9042 |
| Viscosity, SUV at 100° F.: (seconds) | 150 to (solid) |
| Color | Water white to 7 (NPA) |
| Pour point, (liquids only); °F | 0 to 30 |
| Melting point, (solids only); °F | 80 to 265 |

Our invention in its broadest aspects, however, is not limited to the preferred starting material mentioned hereinabove but contemplates the manufacture of diaryl ethers of the general class described from any alkylated phenols. In certain advantageous embodiments of the present invention, for example, we may employ as starting materials, anti-oxidants prepared by reacting various light cracked hydrocarbon distillates and other normally liquid olefinic hydrocarbon mixtures with phenol, in the presence of sulfuric acid, as described in the aforesaid co-pending applications. It is a requisite of such olefin-phenol reaction products, however, insofar as the present processes for making superior improvement agents for mineral oils is concerned, that one or more secondary and/or tertiary carbon linkages be present in the compound.

The following examples are illustrative of the various steps and combination of steps which are advantageous in the commercial practice of the present invention.

The following example illustrates the preparation of a particular mixture of alkyl-phenols which are useful in certain embodiments of the present invention:

EXAMPLE 1

(a) *Preparation of anti-oxidant starting material*

50 gallons of "90 per cent phenol" were mixed with 20 pounds of 98 per cent "black acid", the latter being recovered acid obtained from acid sludge produced in washing hydrocarbon oil with sulfuric acid. The 90 per cent phenol employed had the following properties:

| | |
|---|---|
| Specific gravity: 60°/60° F | 1.050 |
| Melting point, capillary tube: °F | 91.9 |
| Color: NPA | 5 |

The phenol was placed in a suitable iron vessel and heated to a temperature of 120° F. Olefinic gas was then introduced slowly to agitate the phenol and the acid was added in two batches, 10 lb. at first and the remaining 10 lb. two hours later. The temperature at the end of two hours was 150° F., and the mixture was maintained at this temperature for 16 hours, olefinic gas being passed through the mixture during this time at the rate of 1600 cu. ft. per hour. The operation was conducted under a pressure of from 15 to 25 lbs. per sq. in.

The olefinic gas employed in this example was a cracked hydrocarbon gas fraction obtained in the pyrolysis of hydrocarbon oil, and having a specific gravity of 1.785 (the specific gravity of olefin gas as compared to air, which is considered as 1.000). Upon agitation of a sample of this gas with 64 per cent sulfuric acid, the acid absorbed 12.5 per cent by volume of the gas, which may be considered as isobutylene and dienes. The remainder of the sample lost 20 per cent by volume (based on the original volume of gas) by absorption in 87 per cent acid, which may be considered as propylenes, butylenes and similar constituents. The remainder of the sample, upon being washed with bromine water, following the two acid washes, lost 2.6 per cent by volume (based on the original volume of gas), which may be considered as ethylene. The gas, therefore, contained 35.1 per cent by volume of unsaturated constituents.

Upon completion of the operation, there was produced a material representing 300 per cent by volume of the original phenol, i. e. 150 gallons. The crude product was then raised from 200° to 212° F., and 20 gals. of 10 per cent caustic soda solution were added to neutralize the sulfuric acid present. The resultant product, after removal of the caustic layer, was washed with boiling water, live steam being introduced during the washing operation, and was then allowed to settle for two hours after which the aqueous layer was withdrawn. The remaining material was blown with air for two hours in order to reduce the moisture content of the product to two per cent by weight.

The final product, produced as set forth hereinabove, had a volume of 135 gallons and comprised a mixture of about 90 per cent of an oil-soluble material having anti-oxidant properties, and about 10 per cent of what appears to be gasoline-like polymers. It is highly satisfactory anti-oxidant and gum-inhibitor. Typical physical properties of products as thus prepared are as follows:

| | |
|---|---|
| Gravity: °API | 20.8 |
| Viscosity, SUV: seconds, 100° F | 1176 |

EXAMPLE 2

This example illustrates the preparation of the alcoholic solutions of sodium hydroxide employed for forming the sodium phenolates.

Into a suitable vessel equipped with means for agitating and refluxing vaporized solvents, there is introduced 70 pounds of an aqueous solution hydroxide containing 57.5% of sodium hydroxide. To this solution there is added with stirring 621 pounds of commercial ethyl alcohol. The stirring is continued and the mixture heated to approximately 150° F. until an alcoholic solution of the sodium hydroxide is obtained. This solution may be employed to form many of the various sodium phenolates mentioned ante.

EXAMPLE 3

This example illustrates the preparation of alcoholic solutions of the sodium phenolates here employed.

To a warm alcoholic solution of sodium hydroxide such as prepared in Example 2, there is added 262 pounds of the olefin-phenol condensation products, that is a mixture of alkyl-phenols, obtained in Example 1. The mixture is stirred until the said alkyl phenols are converted into the corresponding sodium salts; about 30 minutes usually being required.

EXAMPLE 4

This example illustrates the preparation of the alcoholic solutions of 2:4-dinitro-chlorobenzene and their use in forming the substituted diaryl ethers of the present invention.

Into a suitable vessel equipped with agitating means and a reflux condenser, there is introduced 621 pounds of commercial ethyl alcohol and 202 pounds of 2:4-dinitro-chlorobenzene. The mixture is stirred and heated to approximately 150 F. until a clear solution is obtained.

To this hot alcohol solution, there is gradually added the alcohol solution of sodium phenolates prepared in Example 3, the mixture being boiled under reflux. After all the sodium phenolate solution has been added, the mixture is further boiled until the reaction is substantially complete; about 8 hours boiling under reflux is usually required to complete the reaction.

Then the solution of substituted diaryl ethers so obtained is cooled to about 150° F. and the hot agitated solution passed through suitable filters or filter presses to remove the sodium chloride.

The filtrate contains about 15 per cent by weight of diaryl ethers in solution. It is next distilled to remove substantially all of the alcohol, after which the liquid diaryl ethers remaining in the still are withdrawn. They may be further purified if desired.

In the usual practice of this invention, the hot liquid ethers from the still are discharged into a bath of 1 per cent aqueous sodium hydroxide solution and agitated in that bath until any excess sodium phenolate is extracted. The wash liquor is then separated from the so washed diaryl ethers and the so recovered ethers further washed with approximately three volumes of water to remove any residual sodium chloride and alcohol or traces of caustic soda. After washing with water, the diaryl ethers are then dried.

The mixture of substituted diaryl ethers so obtained had the following properties:

| | |
|---|---|
| Gravity: Bé. at 60° F | 14.4 |
| Viscosity, SUV 100° F | 143.0 |
| Color | 6.5 |
| Pour | −10 |

The following examples are further illustrations of the preparation of the mixtures of alkylphenol which may be converted into substituted diaryl ethers by the methods of the present invention.

EXAMPLE 5

100 parts by weight of phenol were placed in a suitable absorption vessel having a gas inlet below the liquid level and a gas outlet at the top. Advantageously, the gas inlet is arranged to introduce gas into the liquid in a finely divided state to cause agitation and efficient contact. One part by weight of 94.5 per cent sulfuric acid was gradually added to the phenol while agitating. The acid was taken up by the phenol and formed one phase. There was then introduced through the gas inlet a refinery gas having the following approximate composition by volume:

| | |
|---|---|
| Hydrogen and methane | 15.1% |
| Ethane and ethylene | 28.5% |
| Propane and propylene | 36.4% |
| Butane and butylene | 18.6% |
| Pentanes | 1.4% |
| | 100.0% |
| Total unsaturates | 17.5% |
| Specific gravity | 1.20 |

In this example, the gas was introduced at the rate of 4 cu. ft. per hour for every pound of phenol. In this instance, the temperature of the reaction was not controlled and varied from 100° to 185° F. The gas was continuously introduced until the reaction mass had gained in weight about 150 per cent, after which the flow of gas was stopped. The reaction mass was withdrawn and purified by washing with water to remove water-soluble material, after which it was again washed with a 10 per cent solution of caustic soda or potash. The aqueous and dilute caustic washes usually remove about 5 to 10 per cent of the crude oily material, leaving an insoluble portion which is a yellow viscous oil of about 0.904–0.915 specific gravity. This material, when added in the proportion of 0.02% to a cracked gasoline having an induction period of the gasoline to 6 hours without lowering its anti-knock value. The inhibited gasoline showed better stability against deterioration in color than when uninhibited.

Example 6

To 50 gallons of crude cresylic acid (a mixture of phenol, the three cresols, certain xylenols, and the like), 0.25 gallon of 98 per cent sulfuric acid was added in absorption apparatus similar to that described in the foregoing examples, and to this mixture refinery gas was introduced at an initial temperature of 120° F. in the manner before described. The reaction mixture had gained about 190% in volume at the end of 23 hours. The temperature rose to 150° F. in the early stages and was maintained at that point thereafter.

The crude reaction product was purified as before by washing with 10 per cent aqueous caustic soda solution in amount theoretically required to neutralize the acidity of the reaction product. Ten per cent of the crude reaction product was removed by the alkaline wash, leaving a slightly viscous oil having the following properties:

| | |
|---|---|
| Gravity | 21.3° API. |
| Specific gravity: 60°/60° F | 0.9260 |
| Viscosity, SUV: 100° F | 176 seconds |
| Color (Saybolt) | 8 |
| Pour point | 0° F. |

From 50 gallons of crude cresylic acid introduced into the reaction, 130 gallons of purified inhibitor was obtained. 0.01% by weight of this inhibitor, added to a gasoline having an induction period of 2 hours, increased the induction period to 6 hours without lowering the antiknock value. The gasoline so inhibited shows better stability against deterioration in color than when uninhibited.

The mixtures of alkyl-phenol, obtained in Examples 5 and 6 may be converted into advantageous substituted diaryl ethers, by the procedures set forth in Examples 3 and 4. The mixtures of substituted diaryl ethers so obtained are advantageous as improvement agents for mineral oils.

The above examples set forth an illustrative series of steps by which substituted diaryl ethers may be produced from 2:4-dinitro-chlorobenzene and alkyl-phenols by the methods of the present invention. In those examples, the combination and correlation of the various steps into a continuous unitary process is clearly shown with specific materials given for the purpose of illustration. In those examples, the various details may be varied as shown, according to the particular alkyl-phenol or mixtures of such phenols being processed. For instance, we may employ other mixtures of alkyl-phenols in lieu of the particular mixture, prepared by Example 1 and employed in making the sodium phenolate in Example 3. For instance, any of the mixed alkyl phenols prepared in Examples 2, 3 and 5 of Serial No. 99,488, or Examples 1, 2 and 3 of Serial No. 702,258, may be likewise used and converted into valuable substituted diaryl ethers, according to this invention. Further, in lieu of employing mixtures of alkyl-phenols, we may employ relatively pure or a particular alkyl-phenol.

The diaryl ethers obtained from the above mentioned phenols are particularly advantageous in that they contain certain alkyl groups which improve the properties of these diaryl ethers. As for instance, all of them contain an alkyl group in the ortho position to the ether group. Again, the alkyl groups present in such ethers, are groups containing branched chains. Further, as those alkyl groups contain three or more carbon atoms, these ethers are quite readily soluble in mineral oils. The ether produced from 2:4-ditertiary butyl phenol is typical of the ethers which contain a plurality of alkyl groups attached to the phenyl radical. While we have found that it is advantageous to have an alkyl group in the ortho position, we have found that additional alkyl groups in the para position are also advantageous. The above mentioned phenols are but typical illustrations of certain advantageous embodiments of this invention and are not limitive of the generic practice thereof. In the general practice of this invention, other and different alkyl-phenols may be employed. Also alkyl phenols obtained by other methods than by reacting olefins with phenols in the presence of sulfuric acid, may be employed. That is, any of the alkyl-phenols mentioned ante, may be prepared by other methods and the products obtained used in the practice of the present invention.

The various improvements in the process procedures for preparing these new alkylated phenyl ethers, given ante, in addition to being advantageous for the preparation of our new types of alkylated phenyl ethers, such as those containing at least one alkyl group having one branched chain, are also advantageous for the manufacture of alkylated phenyl ethers generally. That is, our improved methods described ante, are advantageous means for producing previously known alkylated phenyl ethers as well as our new alkylated phenyl ethers of 2:4 dinitrobenzene.

However, as stated ante, we find certain diaryl ethers are advantageous for particular purposes. Of these, the substituted diaryl ethers having the following generic formula, are particularly useful as improvement agents for mineral oils and like petroleum products:

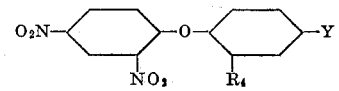

wherein Y represents hydrogen or an alkyl group and $R_4$ represents an alkyl group containing two or more carbon atoms. Those of the above compounds in which either the alkyl group present in the ortho position or para position or both, are alkyl groups containing branched chains, have particular merit; for with such alkyl groups present, the desirable solubility in mineral oils is obtained. As a general class, it is to be noted that these substituted diaryl ethers contain nitro groups in the ortho and para positions in one phenyl radical, whereas the other phenyl radical contains an alkyl group in ortho position and sometimes another alkyl group in the para position. These substituents in those positions, seemingly sensitize the diaryl ethers so that they have marked advantages as improvement agents in mineral oils and for other purposes.

In addition to being useful for improving mineral oils, the dinitro-phenyl alkyl-phenyl ethers obtained by the present invention are useful as intermediates in producing other substituted diaryl ethers. For instance, they can be treated with suitable reducing agents to produce various amino-substituted ethers including di-amino and nitro-amino ethers. Some of these amino compounds are also useful as improvement agents for mineral oils. Further, they are useful as intermediates for making dye-stuffs. Some of them may be diazotized and coupled with coupling components to produce dye-stuffs. Also, they may be used as coupling components in making dye-stuffs.

The various compounds mentioned ante, may be represented by the following generic formula:

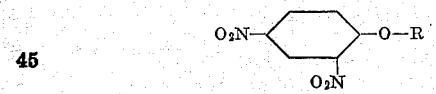

wherein $R_4$ is an alkyl group containing two or more carbon atoms, Y represents hydrogen or an alkyl group and $Z_1$ and $Z_2$ represent a nitro or amino group.

Our invention is not intended to be limited by the specific examples described, but may variously be practiced and embodied within the scope of the claims hereinafter made. That is, our invention in its broadest aspect is not limited to the preferred starting materials hereinbefore mentioned but contemplates the manufacture of substituted diaryl ethers of the general class described from our alkylated phenols. We may employ any of the alkylated phenols which possess definite anti-oxidant properties, and which are insoluble in water, insoluble in alkali and are permanently soluble in paraffin oils. With reference to the specific examples it will be understood that our invention is not limited to the details of such illustrative embodiments or examples.

Moreover, while we have in certain instances specifically given certain preferred ranges and proportions, it will be understood that our invention is not limited thereto and that such preferred ranges and proportions are in general selected for particular products and particular purposes; variations in proportions and in the methods of preparation result in products of different characteristics, such products having individual advantages and utilities.

What we claim is:

1. As new ether compounds, the substituted di-aryl ethers having the following formula:

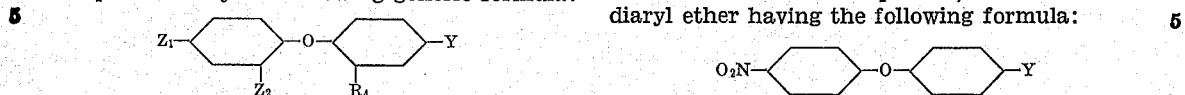

wherein R represents an alkylated phenyl group containing at least one alkyl group having a branched chain.

2. As new ether compounds, the substituted diaryl ether having the following formula:

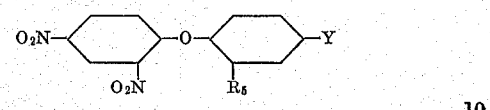

wherein Y represents a substituent of the class consisting of hydrogen and an alkyl group and $R_5$ represents an alkyl group having a branched chain.

3. As a new ether compound, the 2:4-di-tertiary-butylphenoxy ether of 2':4' di-nitro-benzene.

4. As a new ether compound, the 2-tertiary butylphenoxy ether of 2':4' di-nitrobenzene.

5. As a new ether compound, the 2-isopropyl-phenoxy ether of 2':4' di-nitrobenzene.

6. As new ether compounds, the substituted di-aryl ethers having the following formula:

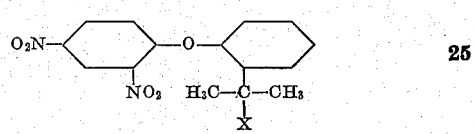

wherein X is a substituent of the class consisting of hydrogen, $CH_3$ and $C_2H_5$, said ether being soluble in mineral oils and capable of improving such oils when dissolved therein in minor amounts.

7. As new ether compounds, the substituted di-aryl ethers having the following formula:

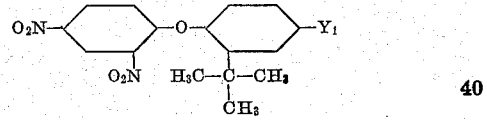

wherein $Y_1$ represents a substituent of the class consisting of hydrogen and a tertiary butyl group.

TROY LEE CANTRELL.
JAMES OTHO TURNER.